United States Patent [19]
Iida et al.

[11] Patent Number: 5,337,159
[45] Date of Patent: Aug. 9, 1994

[54] IMAGE DATA SMOOTHING METHOD

[75] Inventors: Masahiro Iida, Kyoto; Yoshihisa Takeuchi, Joyo, both of Japan

[73] Assignee: Murata Kikai Kabushiki Kaisha, Kyoto, Japan

[21] Appl. No.: 787,072

[22] Filed: Nov. 4, 1991

[30] Foreign Application Priority Data

Nov. 7, 1990 [JP] Japan ................................ 2-301703

[51] Int. Cl.⁵ ...................... H04N 1/415; G06K 9/40
[52] U.S. Cl. ..................................... 358/447; 358/430; 358/445; 358/261.3; 382/54
[58] Field of Search ............... 358/261.1, 261.2, 261.3, 358/430, 445; 382/30, 54

[56] References Cited

U.S. PATENT DOCUMENTS

| | | | |
|---|---|---|---|
| 4,258,392 | 3/1981 | Yamazaki et al. | 358/261.3 |
| 4,626,921 | 12/1986 | Ohtani et al. | 358/261.3 |
| 4,654,719 | 3/1987 | Tomita | 358/261.3 |
| 4,860,114 | 8/1989 | Horikawa et al. | 358/261.2 |

*Primary Examiner*—Mark R. Powell
*Assistant Examiner*—Kimberly A. Williams
*Attorney, Agent, or Firm*—Spensley Horn Jubas & Lubitz

[57] ABSTRACT

An image data smoothing method smooths image data representing a picture transmitted by a facsimile transmitter and received by a facsimile receiver in the normal mode in printing out the image data so that curves and oblique lines of the picture are reproduced satisfactorily. The image data smoothing method comprises steps of determining an objective changing picture element on an objective image data line, determining changing picture elements on a precedent image data line precedent to the objective image data line, and a subsequent image data line subsequent to the objective image data line, producing a correction image data line by reversing a predetermined number of picture elements on the objective image data line determined on the basis of the positional relation between the changing picture elements and continuous with the objective changing picture element, and inserting the correction image data line between the objective image data line and the subsequent image data line in printing out the image data on the successive image data lines.

1 Claim, 8 Drawing Sheets

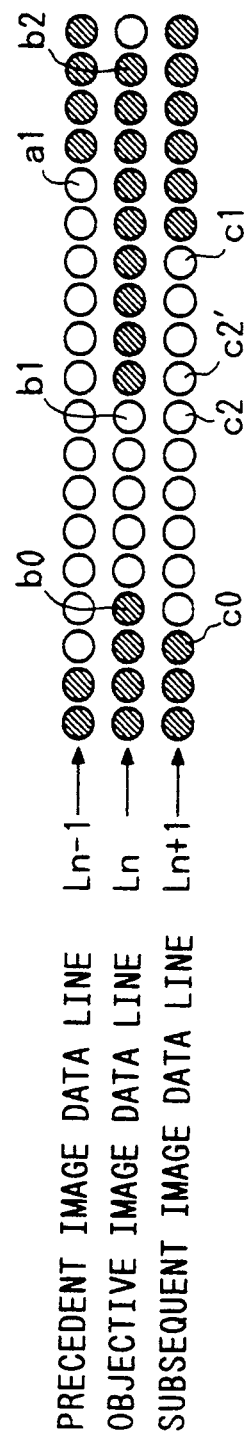

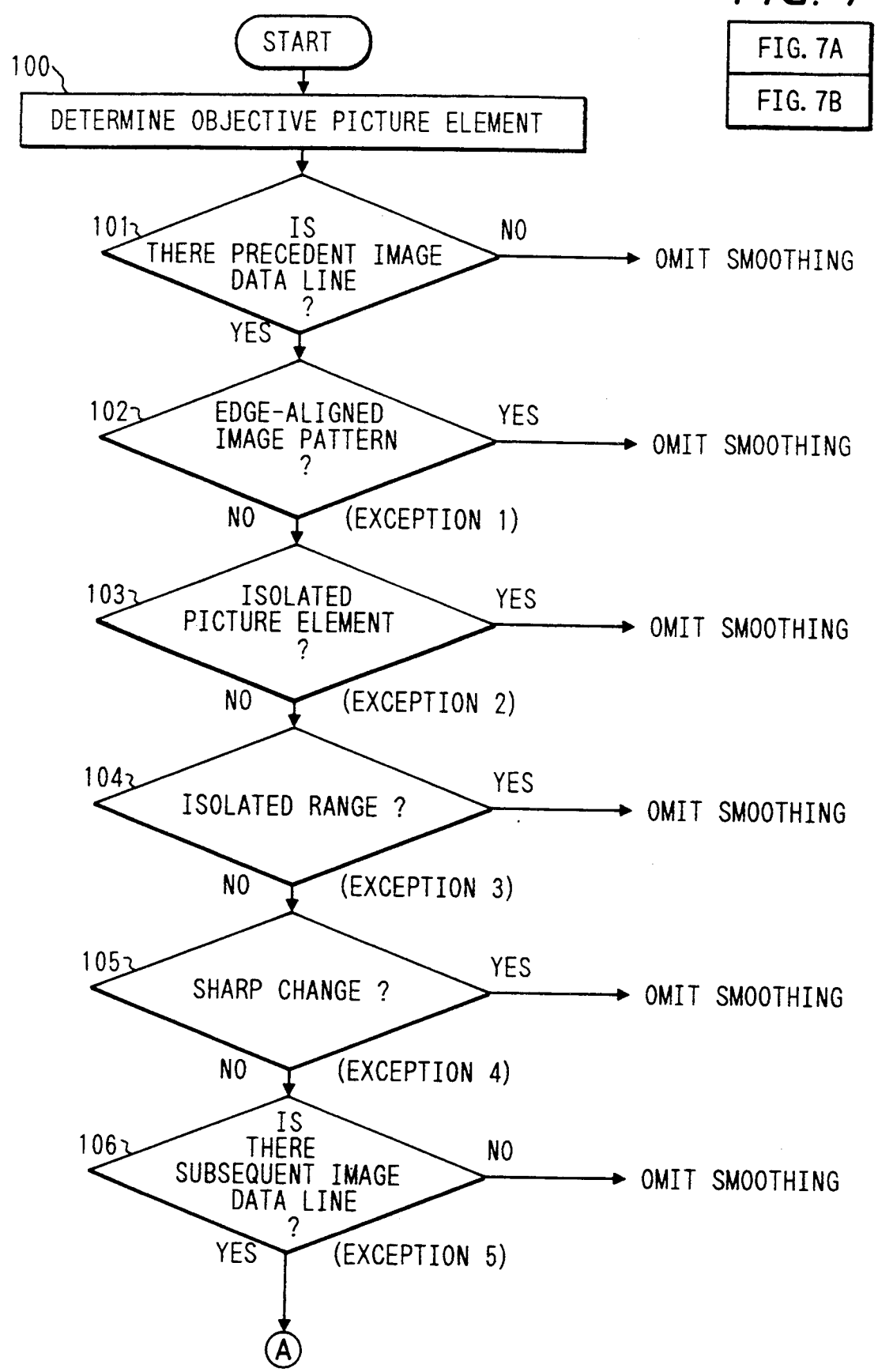

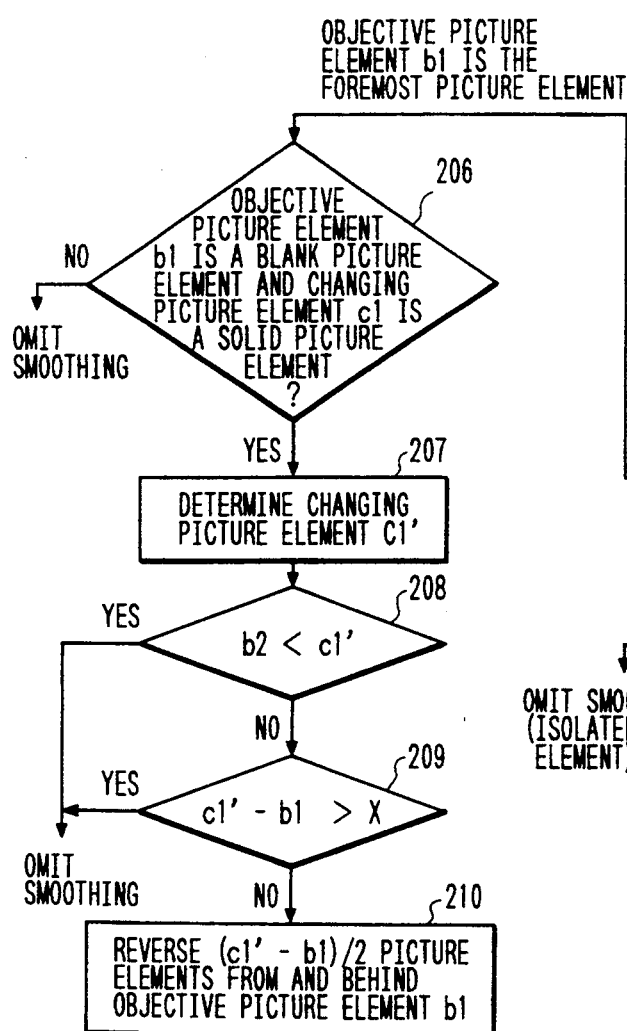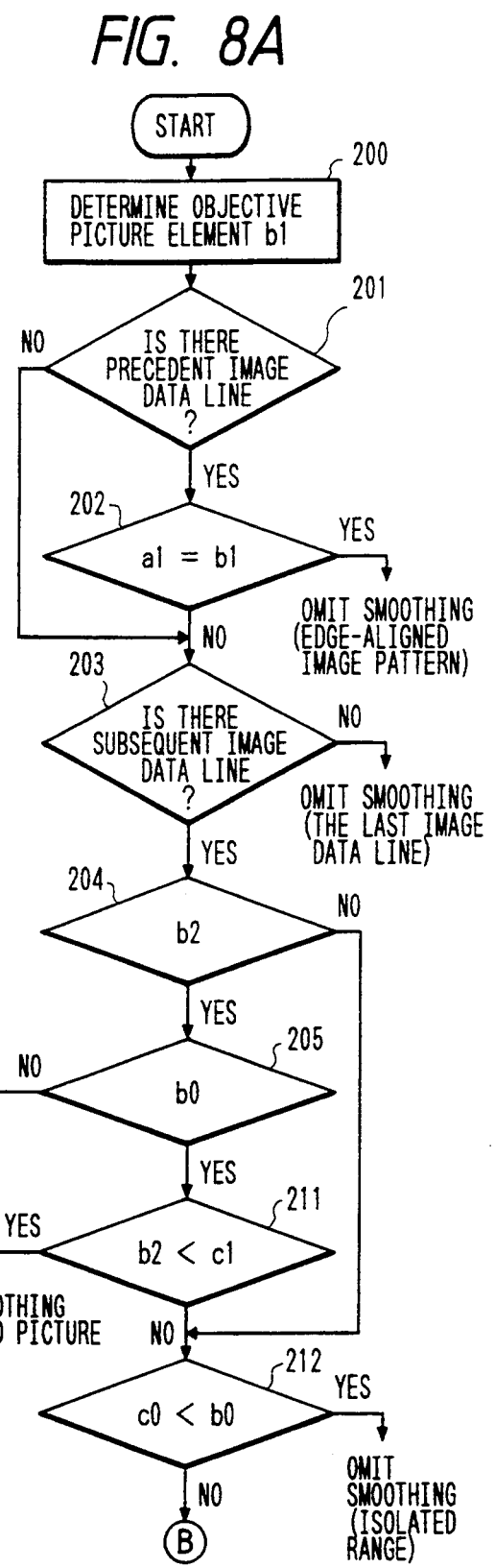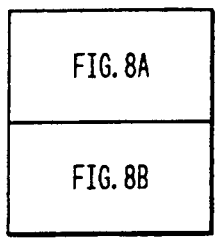
FIG. 8A
FIG. 8
FIG. 8A
FIG. 8B

IMAGE DATA SMOOTHING METHOD

BACKGROUND OF THE INVENTION

1. Field of the Invention

The present invention relates to a method of smoothing image data representing a picture, received by a facsimile receiver or the like and including those representing oblique lines, curves and/or characters to correct image data representing oblique lines, curves, and/or characters so that the picture may be reproduced in a smooth shape.

2. Description of the Prior Art

In transmitting image data and printing the same in the normal mode by the prevalent facsimile communication system, the facsimile transmitter scans a picture in a line density of 7.7 lines per millimeter, transmits the image data of every other scanning lines, and the facsimile receiver duplicates the image data of each scanning line in printing out the picture represented by the image data. For example, in transmitting an original picture having an oblique line as shown in FIG. 11, the original picture is scanned along scanning lines L1 to L6 and is converted into picture elements arranged along scanning lines L1 to L6, and then the picture elements of every other scanning lines, namely, the scanning lines L1, L3 and L5, are transmitted to the facsimile receiver. Then, the facsimile receiver duplicates the scanning lines L1, L3 and L5 in reproducing the original picture. Consequently, the picture elements forming the oblique line of the reproduced picture are arranged stepwise to form an unattractive, rugged oblique line as shown in FIG. 12.

SUMMARY OF THE INVENTION

Accordingly, it is an object of the present invention to provide a method of smoothing image data representing a picture received in the normal mode in printing out the image data so that curves and oblique lines of the picture are reproduced satisfactorily.

An image data smoothing method in accordance with the present invention produces a correction image data line by processing image data on an objective image data line transmitted in the normal mode, and inserts the correction image data line between the objective image data line and the subsequent image data line to correct a picture represented by the image data of the successive image data lines.

BRIEF DESCRIPTION OF THE DRAWINGS

The above and other objects, features and advantages of the present invention will become more apparent from the following description taken in connection with the accompanying drawings, in which:

FIG. 5 is a pictorial view of assistance in explaining terms used in describing the image data smoothing method embodying the present invention;

FIGS. 7, 7A, 7B, 8, 8A and 8B are flow charts showing steps of the image data processing method in accordance with the present invention;

DESCRIPTION OF THE PREFERRED EMBODIMENTS

Figure 1:
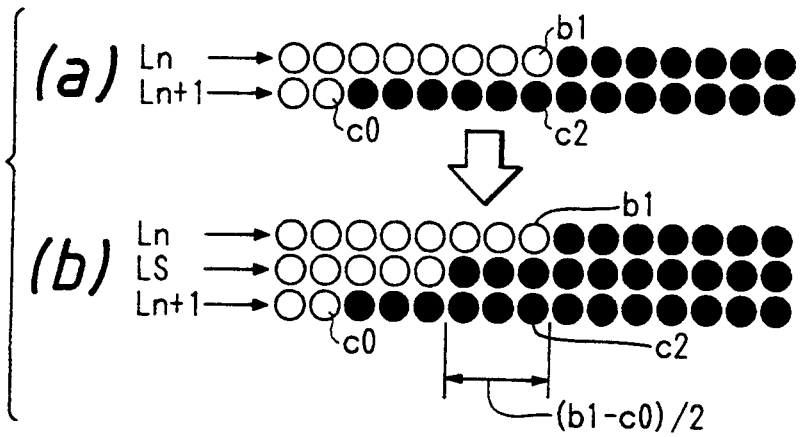
FIGS. 1(a), 2(a), 3(a) and 4(a) are pictorial views of image patterns to be processed by an image data smoothing method embodying the present invention.
FIGS. 1(b), 2(b), 3(b) and 4(b) are pictorial views of image patterns produced by processing the image patterns of FIGS. 1(a), 2(a), 3(a) and 4(a), respectively, by the image data smoothing method embodying the present invention.

The definition of the respective names of image data lines and picture elements to be used in the following description will be described prior to the description of the present invention with reference to FIG. 5, in which terms front and back are used to indicate the left side and the right side of the paper.

Referring to FIG. 5, an objective image data line $L_n$ is an image data line to be subjected to a smoothing process, a subsequent image data line $L_{n+1}$ is an image data line subsequent to the objective image data line $L_n$, a precedent image data line $L_{n-1}$ is an image data line precedent to the objective image data line $L_n$.

In the objective image data line $L_n$, an objective changing picture element b1 is a picture element immediately before the foremost picture element which changes to a blank or solid picture element, and changing picture elements b0 and b2 are located before and behind the objective changing picture element b1, respectively, and are the picture elements immediately before the foremost picture element which changes to a blank or solid picture element.

In the precedent image data line $L_{n-1}$, a changing picture element a1 is a picture element which is located behind or at a position corresponding to the objective changing picture element b1 and is a picture element immediately before the foremost picture element which changes to a blank or solid picture element.

In the subsequent image data line $L_{n+1}$, a picture element c0 is a picture element which is located before the objective changing picture element b1 of the objective image data line $L_n$ and is a picture element immediately before the foremost picture element which changes to a blank or solid picture element. A picture element c1 is a picture element which is located behind or at a position corresponding to the objective changing picture element b1 of the objective image data line $L_n$ and is a picture element immediately before the foremost picture element which changes to a blank or solid picture element. A picture element c1′, not shown, is a picture element behind the picture element c1 and is a picture element immediately before the foremost picture element which changes to a blank or solid picture element.

A reference picture element c2 is a picture element corresponding to the objective changing picture element b1 of the image data line $L_n$, and a reference picture element c2' is a picture element subsequent to the reference picture element c2.

Picture elements respectively precedent to the foremost picture elements and the rearmost picture elements of the image data lines $L_n$, $L_{n-1}$ and $L_{n+1}$ are reverse to the corresponding foremost picture elements and the rearmost picture elements; that is, if an image data line has successive solid picture elements, the foremost picture element of the image line is a picture element which changes from blank to solid and the rearmost picture element of the image line is a picture element which changes from solid to blank.

In smoothing image data by an image data smoothing method in accordance with the present invention, a picture element on an objective image data line $L_n$ is selected as an objective changing picture element b1, a changing picture element a1 is determined on the precedent image data line $L_{n-1}$, reference picture elements c2 and c2' are determined on the subsequent image data line $L_{n+1}$, and then a smoothing procedure is carried out. Every time an objective image data line $L_n$ and an objective changing picture element b1 are determined, a decision is made before starting the smoothing process as to if the image pattern meets a smoothing declining conditions. If the image pattern meets the smoothing declining conditions, the smoothing process is omitted. There are five exceptional image patterns that meet the smoothing declining conditions.

Figure 6A:
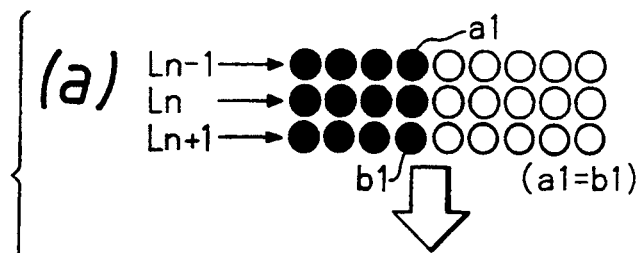
FIGS. 6A(a), (b) to FIGS. 6D(a), (b) are pictorial views of image patterns which are not processed by the image data smoothing method.

In a first exceptional image pattern, an objective picture element b1 on an objective image data line $L_n$ corresponds exactly to a changing picture element a1 on the precedent image data line $L_{n-1}$ (a1=b1) as shown in FIG. 6A(a). Such an image pattern is designated as an edge-aligned image pattern. The smoothing process is omitted for an edge-aligned image pattern regardless of other conditions. Accordingly, any correction image data line $L_s$ is not produced, and a duplicate image data line $L_n'$ exactly like the objective image data line $L_n$ is inserted between the objective image data line $L_n$ and the subsequent image data line $L_{n+1}$ as shown in FIG. 6A(b). An image data line $L_s'$ is a correction image data line when the precedent image data line $L_{n-1}$ is an objective image data line.

Figure 6B:
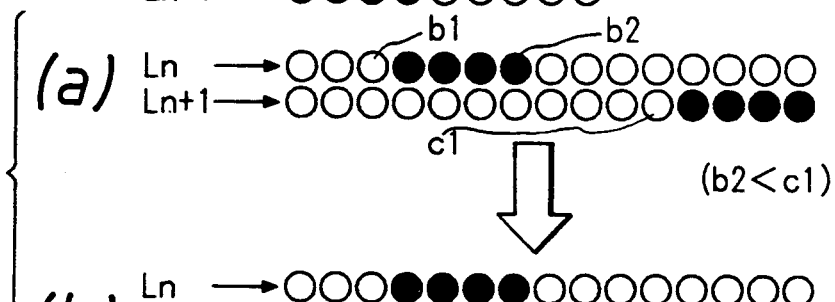

In a second exceptional image pattern, a string of solid picture elements between an objective picture element b1 and a changing picture element b2 on an objective image data line $L_n$, and a string of solid picture elements extending after a changing picture element c1 on a subsequent image data line $L_{n+1}$ are separated from each other and no solid picture element on the objective image data line $L_n$ and no picture element on the subsequent image data line $L_{n+1}$ overlap each other (b2<c1). Such an image pattern is designated as an isolated point pattern. The smoothing process is omitted for an isolated point pattern regardless of other conditions, and a duplicate image data line $L_n'$ exactly like the objective image data line $L_n$ is inserted between the objective image data line $L_n$ and the subsequent image data line $L_{n+1}$ as shown in FIG. 6B(b).

Figure 6C:
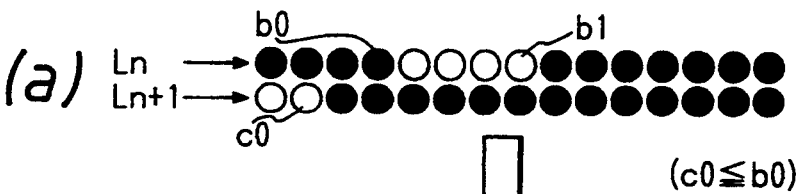

In a third exceptional image pattern, a string of blank picture elements extends between an objective picture element b1 and a changing point b0 on an objective image data line $L_n$, and a string of solid picture elements on a subsequent image data line $L_{n+1}$ extends beyond a range corresponding to the string of blank picture elements between the objective picture element b1 and the changing picture element b0 on the objective image data line $L_n$ (c0≦b0) as shown in FIG. 6C(a). Such an image pattern is designated as an isolated range pattern. The smoothing process is omitted for an isolated range pattern regardless of other conditions, and a duplicate image data line $L_n'$ exactly like the objective image data line $L_n$ is inserted between the objective image data line $L_n$ and the subsequent image data line $L_{n+1}$ as shown in FIG. 6C(b).

Figure 6D:
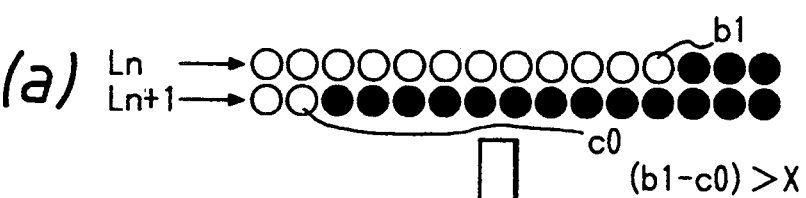

In a fourth exceptional image pattern, an objective picture element b1 on an objective image data line $L_n$ is separated from a changing point c0 or a changing point c1 on the subsequent image data line $L_{n+1}$ by a predetermined number of picture elements, namely, b1−c0>X or c1−b1>X, where X is the empirically determined number of picture elements. If the number of picture elements by which the objective picture element b1 is separated from the changing point c0 or c1 is greater than X, the smoothing of the image pattern will spoil the features of the original picture. In this case the image pattern like that shown in FIG. 6D(a) is not subjected to the smoothing process regardless of other conditions, and a duplicate image data line $L_n'$ exactly like the objective image data line $L_n$ is inserted between the objective image data line $L_n$ and the subsequent image data line $L_{n+1}$ as shown in FIG. 6D(b).

A fifth exceptional image pattern has no subsequent image data line $L_{n+1}$, and an objective image data line $L_n$ is the last image data line.

The image data smoothing method embodying the present invention sets an objective image data line and an objective picture element for each image data every time image data transmitted by the facsimile transmitter is received by the facsimile receiver, decides if the image data represents an exceptional image pattern, and prints out, when the image data does not represent any exceptional image pattern, a correction image data line after the objective image data line.

Steps of the image smoothing method will be described hereinafter.

CHANGING PICTURE ELEMENT DETERMINING PROCEDURE

Upon the reception of an objective image data line $L_n$ and a subsequent image data line $L_{n+1}$ successively by the facsimile receiver, an objective changing picture element b1 is set on the objective image data line $L_n$, and two changing picture elements b0 and b2 are determined respectively on the opposite sides of the objective changing picture element b1.

Two changing picture elements c0 and c1 on the subsequent image data line $L_{n+1}$ are determined. If the changing picture element b0 is not found, namely, if the objective changing picture element b1 is the foremost picture element on the objective line $L_n$, if the objective changing picture element b1 is a blank picture element followed by a solid picture element and if the changing picture element C1 is a solid picture element followed by a blank picture element, another changing picture element c1' located after the changing picture element c1 is determined on the subsequent image data line $L_{n+1}$.

In carrying out the image data smoothing method, it is determined that the foremost picture element and the rearmost picture element on an image data line are reversed. Therefore, the foremost picture element and the rearmost picture element are changing picture elements c0 and c1, respectively, if any changing point is not found between the foremost picture element and the rearmost picture element on the image data line.

If there is a precedent image data line $L_{n-1}$ before the objective image data line $L_n$, a changing picture element a1 is determined on the precedent image data line $L_{n-1}$.

After thus completing the changing picture element determining procedure, a comparison and decision procedure is executed.

COMPARISON AND DECISION PROCEDURE

The positional relation between the changing picture elements a1, b0, b2 and elements c0, c1 or c1' is examined to see if the image pattern represented by the image data lines is one of the five exceptional image patterns (FIGS. 6A(a), 6B(a), 6C(a), 6D(a)) meeting the smoothing declining conditions. If the image pattern is not any one of the exceptional image patterns, a correction image data line $L_s$ is produced by reversing a calculated number of the picture elements of the objective image data line $L_n$ and the correction image data line $L_s$ is inserted between the objective image data line $L_n$ and the subsequent image data line $L_{n+1}$ for smoothing.

IMAGE DATA SMOOTHING PROCEDURE

The classification of the objective changing picture element b1 on the objective image data line $L_n$ is determined with reference to a reference picture element c2 on the subsequent image data line $L_{n+1}$ directly under the objective changing picture element b1, or a reference picture element c2' subsequent to the reference picture element c2. Then, the correction image data line $L_s$ is produced by reversing a predetermined number of picture elements continuous with the objective changing picture element b1, the number being dependent on the classifications of the objective picture element b1 and the reference picture element c2 or c2'.

The image data smoothing procedure will concretely be described hereinafter.

If the objective changing picture element b1 on the objective image data line $L_n$ is a blank picture element, a picture element on the subsequent image data line $L_{n+1}$ directly under the objective changing picture element b1 is selected as the reference picture element c2. If the reference picture element c2 is a solid picture element as shown in FIG. 1(a), the correction image data line $L_s$ is produced by changing (b1−c0)/2 successive blank picture elements on the objective image data line $L_n$ from the objective picture element b1 toward the front into solid picture elements as shown in FIG. 1(b). If (b1−c0)/2 is not an integer, the number of picture elements to be reversed is determined by omitting the decimal fraction, which applies to the following procedures.

If changing picture element b0 is not found, the objective changing picture element b1 is a blank picture element, and the changing picture element c1 is a solid picture element, a changing picture element c1' located further behind the changing picture element c1 is determined. If the changing picture element c1' meets neither an inequality: b2<c1' nor an inequality: (c1'−b1)>X, (c1'−b1)/2 solid picture elements behind the objective changing picture element b1 on the objective image data line $L_n$ are changed into blank picture elements. If either the inequality: b2<c1' or the inequality: c1'−b1>X is satisfied, the smoothing procedure is not executed.

Figure 2:
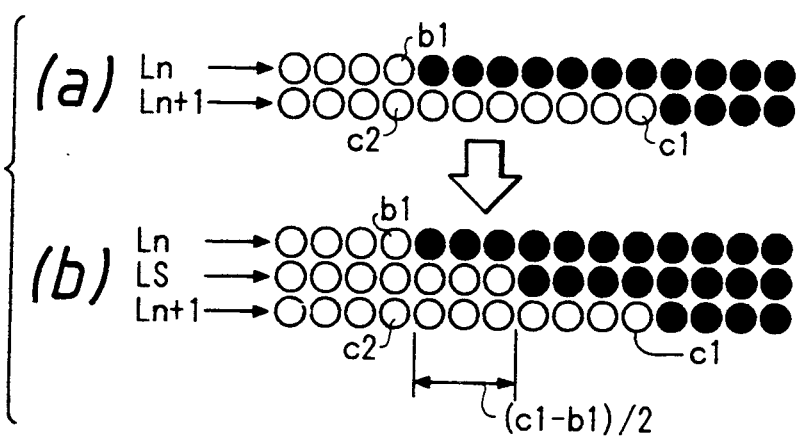

If the reference picture element c2 is a blank picture element as shown in FIG. 2(a), the correction image data line $L_s$ is produced by changing the (c1−b1)/2 solid picture elements from the objective changing picture element b1 on the objective image data line $L_n$ into blank picture elements as shown in FIG. 2(b).

If the objective changing picture element b1 on the objective image data line $L_n$ is a solid picture element, the picture element c2' subsequent to the picture element c2 on the subsequent image data line $L_{n+1}$ is employed as a reference picture element.

Figure 3:
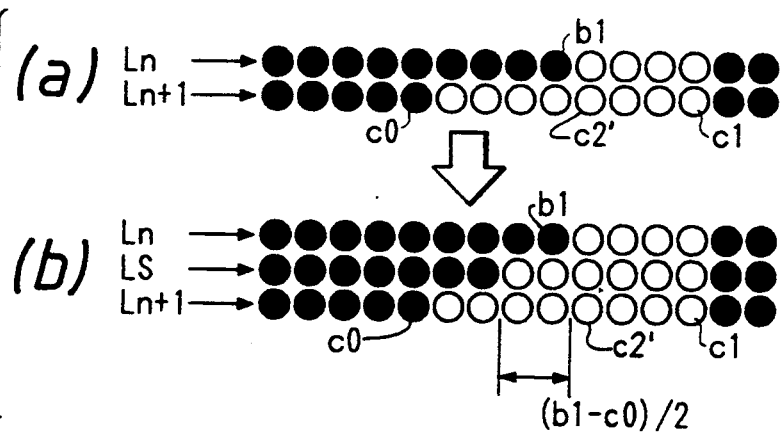

If the reference picture element c2' is a blank picture element as shown in FIG. 3(a), a correction image data line $L_s$ is produced by changing (b1−c0)/2 solid picture elements from and before the objective changing picture element b1 on the objective image data line $L_n$ into blank picture elements as shown in FIG. 3(b).

Figure 4:
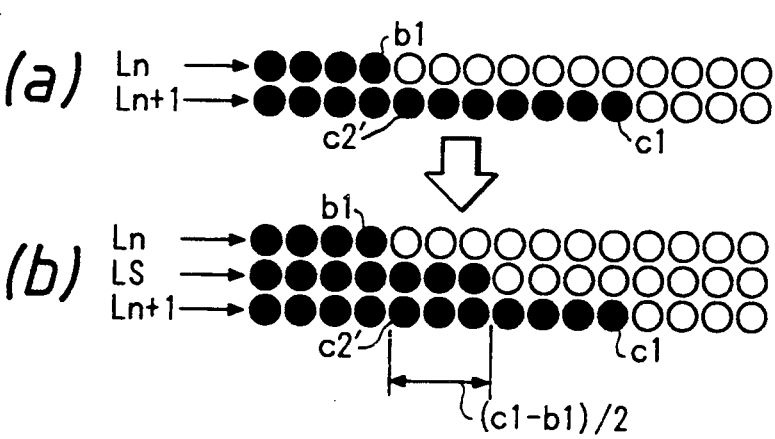

If the reference picture element c2' is a solid picture element as shown in FIG. 4(a), a correction image data line $L_s$ is produced by changing (c1−b1)/2 blank picture elements from and behind the objective picture element b1 into solid picture elements as shown in FIG. 4(b).

Figure 7B:
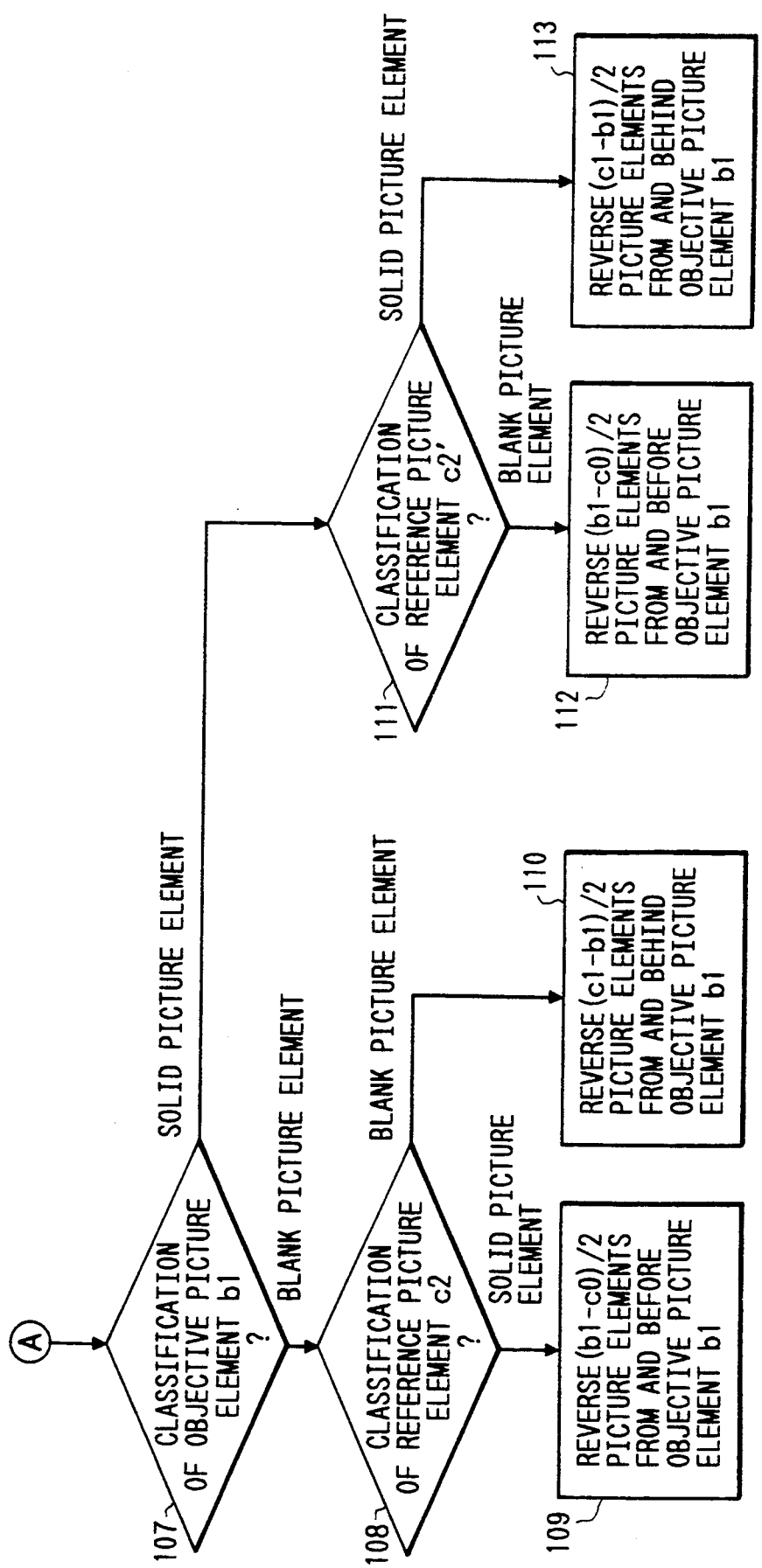
Figure 8B:
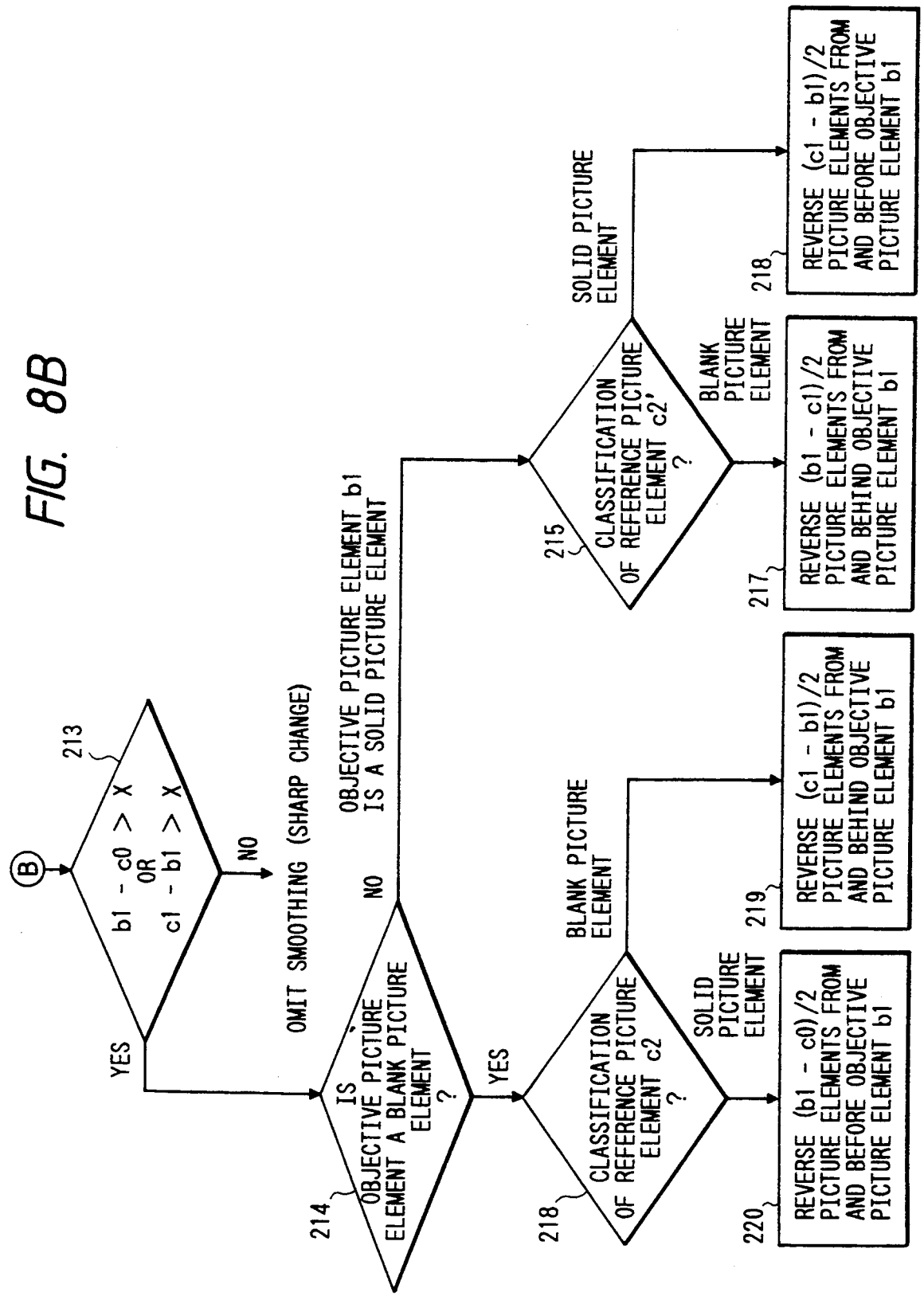
Figure 9:
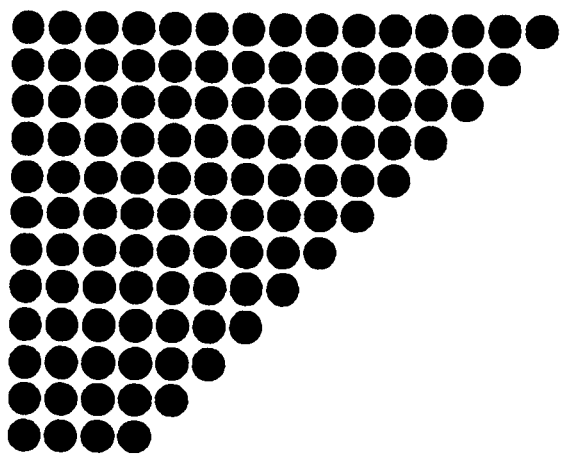
FIG. 9 is a pictorial view of a printed picture represented by image data processed by the image data smoothing method in accordance with the present invention.
Figure 10:
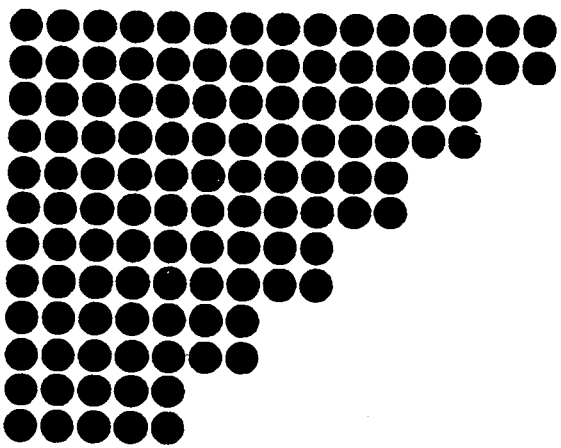
FIG. 10 is a pictorial view of a printed picture represented by image data received in the conventional normal mode.
Figure 11:
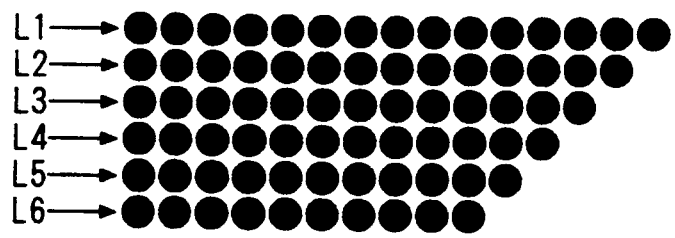
FIG. 11 is a pictorial view of image data produced by a facsimile transmitter in the normal mode.
Figure 12:
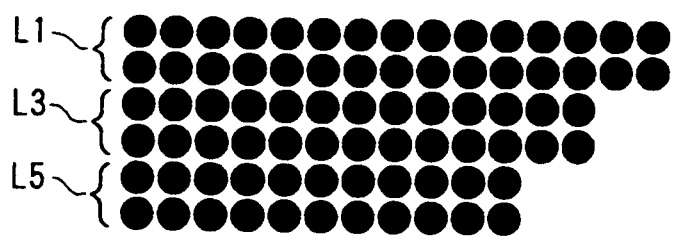
FIG. 12 is a pictorial view of the image data of FIG. 11 reproduced by a facsimile receiver in the normal mode.

The foregoing procedures of the image data smoothing method excluding the procedure involving the picture element c1' are expressed by steps 100 to 113 of a flow chart shown in FIG. 7. Details of the foregoing procedures involving the picture element c1' are expressed by steps 200 to 220 of a flow chart shown in FIG. 8.

Although the invention has been described in its preferred form with a certain degree of particularity, obviously many changes and variations are possible therein. It is therefore to be understood that the invention may be practiced otherwise than as specifically described herein without departing from the scope and spirit thereof.

What is claimed is:

1. An image data smoothing method comprising the steps of:

identifying an object image data line comprising a plurality of pixels, identifying an adjacent image data line comprising a plurality of pixels adjacent to the object image data line, identifying an object changing pixel in the object image data line, identifying a reference changing pixel in the adjacent image data line, the object changing pixel and the reference changing pixel defining a positional relationship, generating a correction image data line by reversing a specified number of pixels adjacent to the object changing pixel in the object image data line, wherein the specified number of pixels is a function of the positional relationship between the object changing pixel and the reference changing pixel, and inserting the correction image data line between the object image data line and the adjacent image data line, whereby an image comprising the object image data line, the correction image data line and the adjacent image data line is produced.

* * * * *